US008099233B2

(12) United States Patent
Matsuno et al.

(10) Patent No.: US 8,099,233 B2
(45) Date of Patent: Jan. 17, 2012

(54) MAP DISPLAY CONTROLLER AND COMPUTER READABLE MEDIUM INCLUDING INSTRUCTIONS FOR DISPLAYING MAP IMAGE

(75) Inventors: Nagako Matsuno, Nagoya (JP); Kei Nagiyama, Nagoya (JP)

(73) Assignee: Denso Corporation, Kariya (JP)

( * ) Notice: Subject to any disclaimer, the term of this patent is extended or adjusted under 35 U.S.C. 154(b) by 981 days.

(21) Appl. No.: 12/073,815

(22) Filed: Mar. 11, 2008

(65) Prior Publication Data

US 2008/0249703 A1 Oct. 9, 2008

(30) Foreign Application Priority Data

Apr. 9, 2007 (JP) ................................. 2007-101382

(51) Int. Cl.
*G01C 21/34* (2006.01)

(52) U.S. Cl. ................ 701/201; 701/211; 340/995.1; 340/995.13; 340/995.15; 340/995.17; 340/995.19; 340/995.2; 340/995.27

(58) Field of Classification Search .......... 340/988–996; 701/200–216
See application file for complete search history.

(56) References Cited

U.S. PATENT DOCUMENTS

| 6,169,552 | B1 * | 1/2001 | Endo et al. ..................... 345/427 |
| 6,324,469 | B1 * | 11/2001 | Okude et al. .................. 701/208 |
| 6,356,840 | B2 * | 3/2002 | Kusama ........................ 701/211 |
| 6,360,168 | B1 * | 3/2002 | Shimabara ..................... 701/211 |
| 6,388,688 | B1 * | 5/2002 | Schileru-Key ................. 715/854 |
| 6,587,784 | B1 * | 7/2003 | Okude et al. .................. 701/208 |
| 6,710,774 | B1 * | 3/2004 | Kawasaki et al. ............. 345/419 |
| 6,871,143 | B2 * | 3/2005 | Fujiwara ....................... 701/211 |
| 6,999,075 | B2 * | 2/2006 | Kumagai ....................... 345/420 |
| 7,039,630 | B2 * | 5/2006 | Shimazu ....................... 707/706 |
| 7,974,781 | B2 * | 7/2011 | Emoto et al. .................. 701/211 |
| 2002/0063705 | A1 * | 5/2002 | Moriwaki et al. ............. 345/422 |
| 2004/0049341 | A1 | 3/2004 | Fujiwara |
| 2005/0234638 | A1 * | 10/2005 | Ogaki et al. .................. 701/209 |
| 2010/0052949 | A1 * | 3/2010 | Suddreth et al. ........ 340/995.19 |

FOREIGN PATENT DOCUMENTS

| JP | A-09-212083 | 8/1997 |
| JP | A-09-318381 | 12/1997 |
| JP | A-H10-141976 | 5/1998 |
| JP | A-2000-207577 | 7/2000 |
| JP | A-2000-304558 | 11/2000 |
| JP | A-2000-306084 | 11/2000 |
| JP | A-2000-321974 | 11/2000 |
| JP | A-2001-227965 | 8/2001 |

(Continued)

OTHER PUBLICATIONS

Office Action dated Nov. 22, 2010 in corresponding Chinese patent application No. 2008 1009 2145.3 (and English translation).

(Continued)

*Primary Examiner* — Jonathan M Dager

(74) *Attorney, Agent, or Firm* — Posz Law Group, PLC

(57) ABSTRACT

A map display controller displays a three-dimensional map image on a display screen of a display device, and superimposes a route wall standing from a route and along the route in the three dimensional map image on the display device. This reduces a difficulty in confirming the route behind structures such as a building in the three-dimensional map image displayed on the display screen.

32 Claims, 10 Drawing Sheets

FOREIGN PATENT DOCUMENTS

| | | |
|---|---|---|
| JP | A-2003-322535 | 11/2003 |
| JP | A-2005-326210 | 11/2005 |

OTHER PUBLICATIONS

Office Action dated Jan. 22, 2009 in corresponding Japanese patent application No. 2007-101382 (and English translation).
Office Action dated Aug. 14, 2009 in corresponding Japanese patent application No. 2007-101382 (and English translation).
Final Office Action dated Mar. 31, 2010 in corresponding Japanese patent application No. 2007-101382 (and English translation).
Office Action dated May 25, 2011 from the China Patent Office in the corresponding patent application No. 200810092145.3.

* cited by examiner

# MAP DISPLAY CONTROLLER AND COMPUTER READABLE MEDIUM INCLUDING INSTRUCTIONS FOR DISPLAYING MAP IMAGE

CROSS REFERENCE TO RELATED APPLICATION

This application is based on and incorporates herein by reference Japanese Patent Application No. 2007-101382 filed on Apr. 9, 2007.

FIELD OF THE INVENTION

The present invention relates to a map display controller for displaying a three-dimensional map image on a display device and a computer readable medium including instructions for displaying a map image.

BACKGROUND OF THE INVENTION

A known technique displays a road map three-dimensionally on a display device. In such a technique, a route including multiple roads connected in-line is sometimes hidden behind structures such as a building and topography shown three-dimensionally; thereby, the road may not be confirmed. To address such a disadvantage, the following techniques for processing graphics of structures have been proposed as follows: a technique for reducing height of buildings around the route; and a technique for drawing buildings by use of wire frames (for example, see Patent Documents 1 to 5).
Patent Document 1: JP-H9-212083 A
Patent Document 2: JP-H9-318381 A
Patent Document 3: JP-2000-207577 A
Patent Document 4: JP-2000-304558 A
Patent Document 5: JP-2000-321974 A

SUMMARY OF THE INVENTION

An object of the present invention is to provide a technique for addressing the above disadvantage that a route is hidden behind structures such as a building in a three-dimensional map image on the display device and thus it is difficult to confirm the route.

According to a first example of the present invention, a map display controller for displaying a three-dimensional map image on a display device is provided as follows. A route specifying unit is configured to specify a route in the three-dimensional map image. A towering structure configuring unit is configured to generate configuration data for configuring a towering structure standing from the route and along the route in a three-dimensional space shown by the three-dimensional map image. A display instruction unit is configured to display, on the display device, an image of the towering structure incorporated in the three-dimensional map image in accordance with the configuration data generated by the towering structure configuring unit so that a portion behind the towering structure in the three-dimensional space in the three-dimensional map image is able to be seen translucently or transparently through the towering structure.

According to a second example of the present invention, a map display controller for displaying a three-dimensional map image on a display device is provided as follows. A route specifying unit is configured to specify a route in the three-dimensional map image. A towering structure configuring unit is configured to generate configuration data for configuring a towering structure standing in a shape of a wall along the route specified by the route specifying unit, in a three-dimensional space shown by the three-dimensional map image. A display instruction unit is configured to display, on the display device, an image of the towering structure incorporated in the three-dimensional map image in accordance with the configuration data generated by the towering structure configuring unit. Herein, the towering structure configuring unit is further configured to specify wall surface display information displayed on a wall surface of the towering structure as part of the configuration data.

According to a third example of the present invention, a computer readable medium comprising instructions being executed by a computer is provided as follows. The instructions include a computer-implemented method for displaying a three-dimensional map image on a display device and include the following: (i) specifying a route in the three-dimensional map image; (ii) generating configuration data to configure a towering structure which stands along the route specified in a three-dimensional space shown by the three-dimensional map image; and (iii) displaying, on the display device, an image incorporated in the towering structure in the three-dimensional map image in accordance with the configuration data generated so that a portion behind the towering structure in the three-dimensional space in the three-dimensional map image is able to be seen translucently or transparently through the towering structure.

According to a fourth example of the present invention, a computer readable medium comprising instructions being executed by a computer is provided as follows. The instructions include a computer-implemented method for displaying a three-dimensional map image on a display device and include the following: (i) specifying a route in the three-dimensional map image; (ii) generating configuration data to configure a towering structure which stands along the route specified by the route specifying unit in a three-dimensional space shown by the three-dimensional map image, the configuration data including information displayed on a wall surface of the towering structure; and (iii) displaying, on the display device, an image of the towering structure incorporated in the three-dimensional map image in accordance with the configuration data generated.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
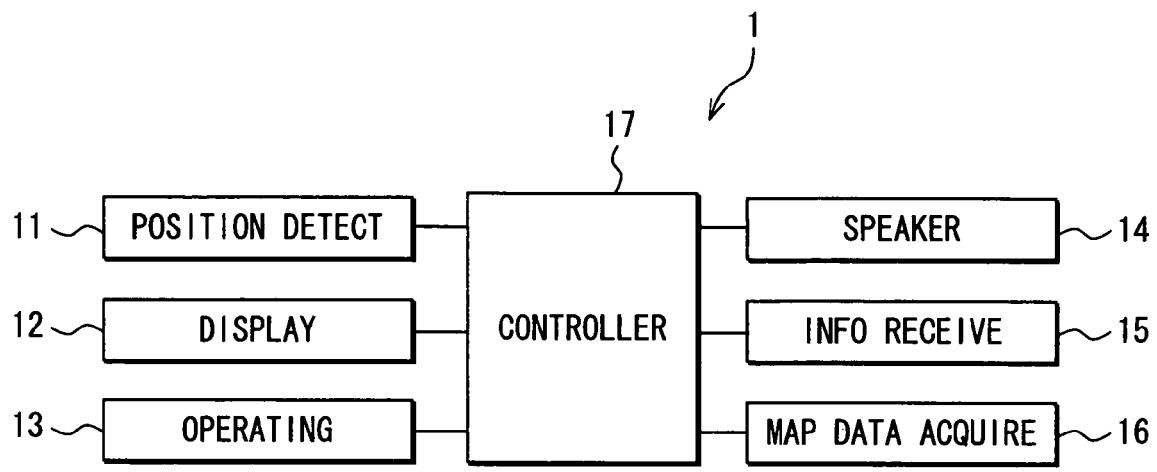
FIG. 1 is a hardware configuration of a vehicular navigation apparatus of a first embodiment of the present invention.

A first embodiment of the present invention is explained below. FIG. 1 shows a structure of hardware of a vehicular navigation apparatus 1 of this embodiment. This vehicular navigation apparatus 1 includes a position detection section 11, a display device 12, an operating section 13, a speaker 14, an external information receiving section 15, a map data acquisition section 16, and a control section 17.

The position detection section 11 includes well-known sensors (not shown) such as a geomagnetic sensor, a gyroscope, a speed sensor, and a GPS receiver, and outputs the information for specifying a current position, direction, and speed of a vehicle in accordance with each characteristic of these sensors to the control section 17.

The display device 12 displays an image based on an image signal outputted from the control section 17 on a two-dimensional display screen.

The operating section 13 includes input devices such as multiple mechanical switches provided to the vehicular navigation apparatus 1, a touch panel superimposed on the display screen of the display device 12, and a control stick installed near a driver seat, and outputs a signal based on operation of the above-mentioned input device by a user to the control section 17.

The external information receiving section 15 communicates with a communication device outside the vehicle by wireless. Then, the external information receiving section 15 obtains current weather data, weather forecast data, current traffic data (accidents, traffic congestion, road traffic regulations, etc.), and future traffic data (accidents, traffic congestion, road traffic regulations, etc.) in various regions from the communication device, and outputs the obtained data to the control section 17.

The map data acquisition section 16 includes a nonvolatile medium such as DVD, CD, and HDD and a device which reads data from (if possible, writes data to) the medium. The medium stores a program executed by the control section 17, map data, multiple tune data, multiple additional tune data, etc.

The map data has road data and facility data. The road data includes position information and type information about links, position information and type information about nodes, information about the connection between the nodes and links, three-dimensional shape information about the nodes, three-dimensional shape information about the links, etc. The facility data includes multiple records of facilities, and each record has data showing name information, position information, detail information, and three-dimensional shape information about a target facility. The three-dimensional shape information about links, nodes, and facilities show three-dimensional structures including three-dimensional shapes and surface colors of the links, nodes, and facilities.

Each tune data shows advance of sound of a tune (for example, Wave data and Mpeg-1 Layer-3). Each additional tune data corresponds to one tune data, and shows information about the tune (for example, an image of the jacket of the album including the tune, the tune list of the album, a time required to play the whole tune, and a time required to play the whole album).

The control section 17 equivalent to a computer is a microcomputer having a CPU, RAM, ROM, I/O, etc. The CPU executes a program for operation of the vehicular navigation apparatus 1, the program being read from the RAM or map data acquisition section 16. In the execution, the CPU reads information from the RAM, ROM, and map data acquisition section 16. Then, the CPU writes information to a storage medium of the RAM and (if possible) map data acquisition section 16 to transfer signals to and from the position detection section 11, display device 12, operating section 13, speaker 14, and external information receiving section 15.

Concrete processes done when the control section 17 executes the program include current position specifying, three-dimensional map image displaying, guidance route calculation, route guidance, tune playing, etc.

In the current position specifying, a current position and direction of a vehicle is specified based on signals from the position detection section 11 by use of a technique such as well-known map matching.

In the three-dimensional map image display process, a three-dimensional map image is displayed on the display screen of the display device 12 in accordance with the map data. The three-dimensional map image is displayed on a two-dimensional surface as a landscape which can be seen when a person overlooks the ground from a certain three-dimensional viewpoint in a certain direction (north, south, northeast, etc.) at a certain depression angle (namely, an overlook angle relative to the horizontal direction).

The control section 17 specifies positions of nodes, links, and facilities in a certain area on the map from the map data to display a three-dimensional map image of the area on the display device 12. The control section 17 specifies three-dimensional structures in the three-dimensional space in the area in accordance with three-dimensional shape information about the specified nodes, links, and facilities. Then, the control section 17 generates a two-dimensional projection image of a landscape where the three-dimensional structures are overlooked from a standard viewpoint in a standard direction at a standard depression angle, and outputs the projection image to the display device 12 as a three-dimensional map image.

The standard viewpoint may be constant relative to the center coordinates (latitude, longitude) in the range of a display target on the map, or may change continuously or gradually based on the operation of the operating section 13 by the user. One or both of the standard direction and certain depression angle may be constant, or may change continuously or gradually based on the operation of the operating section 13 by the user.

In the route guidance calculation, the input of a destination by a user is received from the operating section 13 to compute an optimum guidance route from a current position to a destination. In this route guidance calculation, as a support function for making the user select a destination, the control section 17 may also execute the three-dimensional image display process.

In the route guidance, an image highlighting the computed guidance route and superimposed on the three-dimensional map image is displayed on the display device 12, and a guidance voice signal for instructing a right turn, a left turn, etc. is outputted to the speaker 14 when needed such as when a user's vehicle reaches a guidance crossing. A the same time, the control section 17 executes the three-dimensional image display process to display the image highlighting the computed guidance route and superimposed on the three-dimensional map image.

In the tune playing, a tune based on a progress of the tune described in the above tune data is outputted to the speaker 14.

Figure 2:
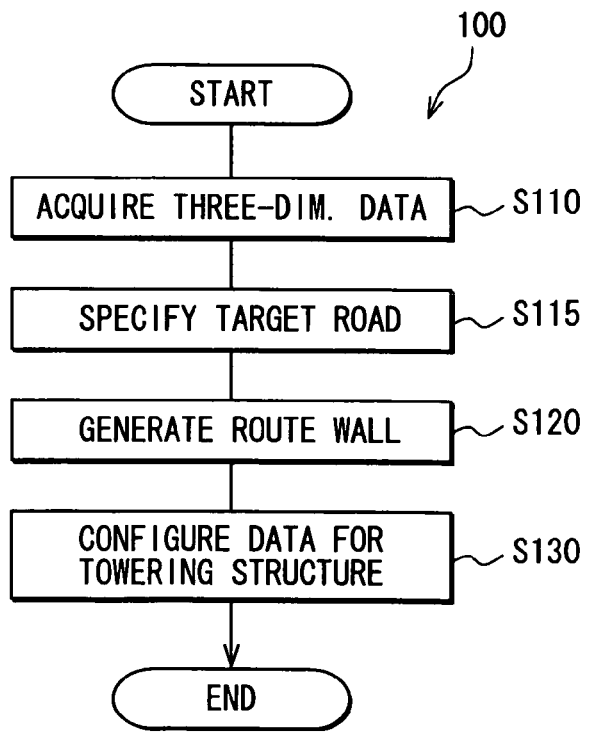
FIG. 2 is a flowchart of a program executed by a control section of the vehicular navigation apparatus according to the first embodiment.

FIG. 2 shows a flowchart of a program 100 executed by the control section 17 for superimposing an image of a highlighted guidance route on a three-dimensional map image. In the image of the highlighted guidance route, a route wall stands vertically and upward from the guidance route in the three-dimensional space along the route.

As shown in FIG. 2, first at S110, the control section 17 acquires three-dimensional data of a map in an area to be displayed. Specifically, through the above method, a certain three-dimensional structure formed from nodes, links, and facilities in the three-dimensional space in the area is specified.

At S115, a route wall configuration target road is specified in the three-dimensional structure. The route wall configuration target road is a road on which the route wall is configured. The guidance route corresponds to the route wall configuration target road. At S115, estimated passage schedule information about the specified route wall configuration target road is produced. The estimated passage schedule information shows future passage times of a user's vehicle at multiple positions on the route wall configuration target road. This estimated passage schedule information may be specified based on, e.g., distances to the multiple positions along the route and an average speed (for example, 30 km/h) of a vehicle.

At S120, three-dimensional data of the route wall to be configured as the route wall configuration target road is generated. This data generation is explained later in detail.

At S130, a three-dimensional structure is generated by combining the three-dimensional data of the map generated at S110 with the route wall generated at S120. A two dimensional projection image of the landscape of the three-dimensional structure overlooked from a predetermined viewpoint in a predetermined direction at a predetermined depression angle is generated, and outputted to the display device 12. At this time, the projection image outputted to the display device 12 shows an image of the route wall, corresponding to one example of a towering structure, incorporated in the three-dimensional map image. The techniques for generating projection images from three-dimensional structures are well known. Any of the techniques may be used. For example, the technique for generating a projection image from a three-dimensional structure in which polygons are combined three-dimensionally may be used.

Figure 3:
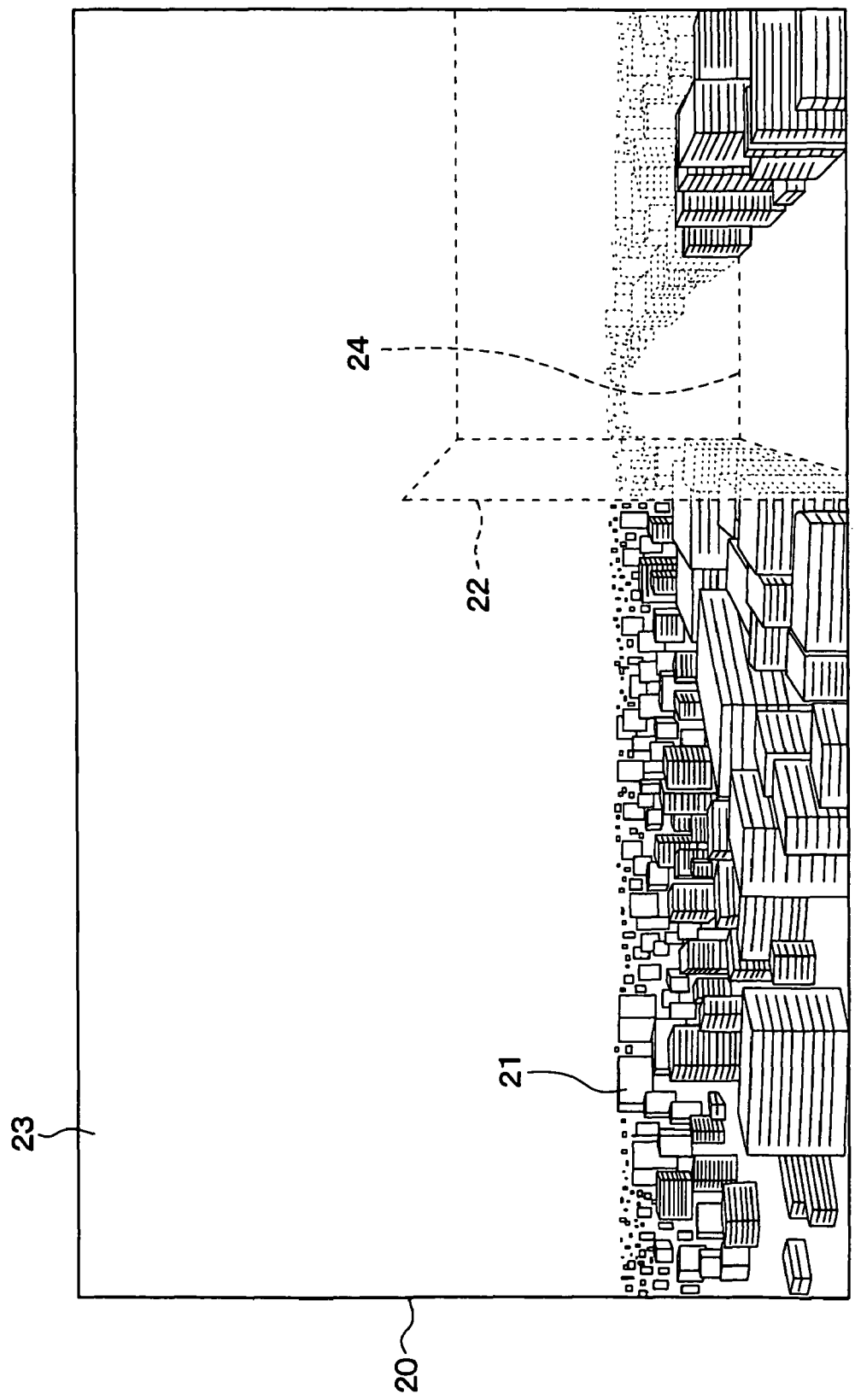
FIG. 3 shows a three-dimensional map image and a route wall simultaneously displayed on a display screen of a display device according to the first embodiment.

FIG. 3 illustrates a three-dimensional map image 21 and a route wall 22 simultaneously displayed on the display screen 20 of the display device 12. In this specification, a portion 23 corresponding to the sky in the display screen 20 is not part of the three-dimensional map image. The route wall 22 is displayed as a wall-shaped object towering vertically upward from a guidance route 24 along the guidance route 24 in the three-dimensional space.

Accordingly, since the route wall 22 standing from the guidance route 24 in the three-dimensional space projected on the display screen 20 is above the guidance route 24, it is easier to see the route wall 22 than the guidance route 24. Further, since the route wall 22 stands from the guidance route 24 along the guidance route 24, a position of the route wall 22 shows a position of the guidance route 24 directly. Therefore, when the three-dimensional map image is displayed on the display screen 20, the guidance route 24 can be confirmed easily.

In FIG. 3, the route wall 22 is colored plain white. An average color of the three-dimensional map image 21 is usually dark color such as deep brown, deep green, and deep gray. In this case, the route wall 22 is expressed by white, which can be distinguished from the three-dimensional map image 21 clearly, so that the guidance route 24 is recognized easier. By using light color such as white, the route wall 22 looks like a light band. Therefore, the possibility that the route wall 22 makes the user feel tightness is reduced.

In the three-dimensional map image 21, the landscape behind the route wall 22 in the three-dimensional space can be seen translucently or transparently through the route wall 22. In other words, the color of the route wall 22 is transmission color. Accordingly, since a portion behind the route wall 22 can be seen from the user through the route wall 22, the decrease of visibility of structures behind the route wall 22 can be reduced.

The generation of the three-dimension data of the route wall 22 by the program 100 at S120 is further explained below. In the generation of the three-dimension data of the route wall 22, as configuration data for configuring the route wall, data of height of the route wall relative to the guidance route, data of a wall surface design of the route wall, position data of the route wall when incorporating the route wall in the three-dimensional structure of the map, etc. are determined.

The wall surface design indicates appearance, such as a color, pattern, and transparency of the wall surface and contents of information displayed on the wall surface, except a shape of the wall surface. As described above, the control section 17 determines that the route wall is positioned standing from a guide route in the map vertically and upwardly.

Figure 4:
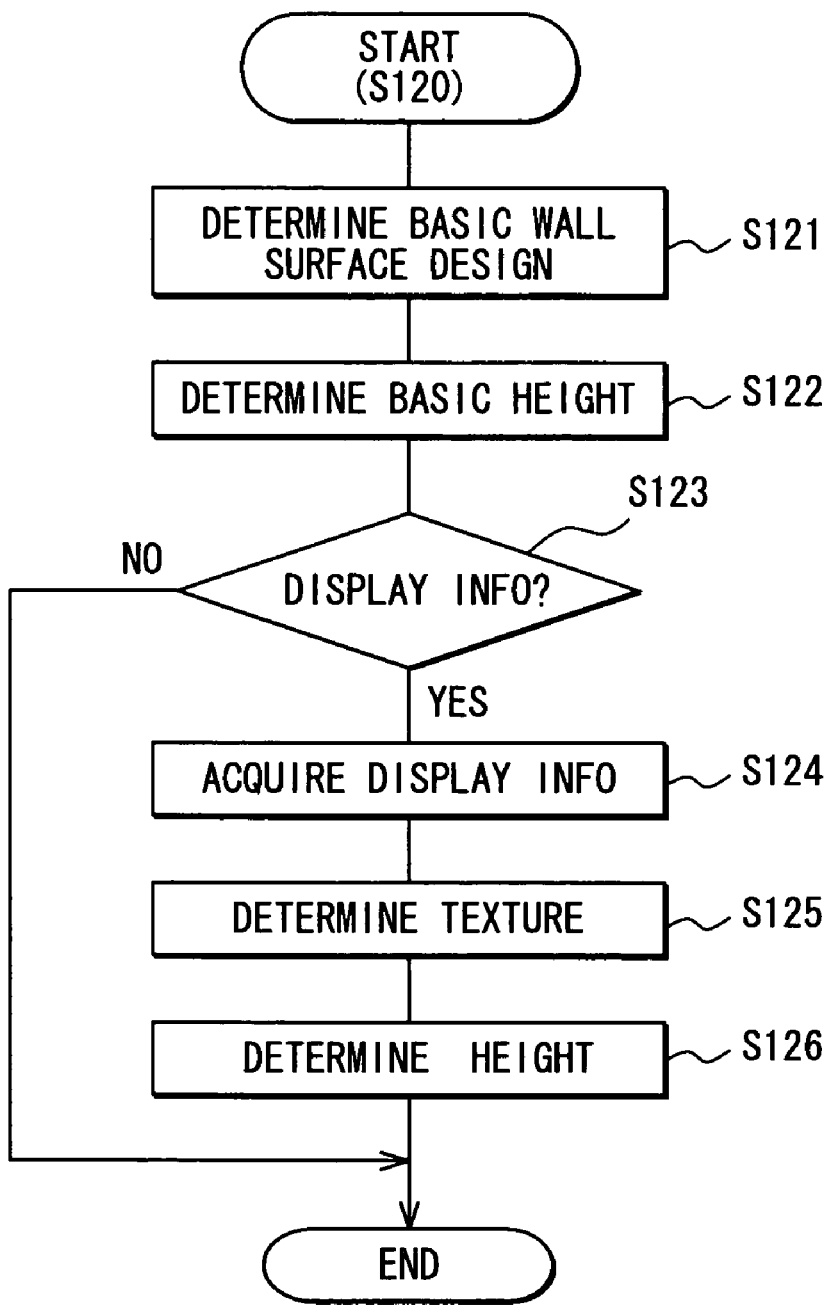
FIG. 4 is a flowchart for generating three-dimensional data according to the first embodiment.

The control section 17 determines height of the route wall, the wall surface design of the route wall, and information displayed on the wall surface of the route wall by executing the processing shown in FIG. 4 as a flowchart.

In the processing shown in FIG. 4, the control section 17 determines a basic wall surface design of the route wall at S121, and then determines a basic height of the route wall at S122. The control section 17 determines whether to display information on the route wall at S123. When the control section 17 determines not to display information on the route wall, the control section 17 determines the basic wall surface design and basic height as the wall surface design and height of the route wall. When the control section 17 determines to display information on the route wall, the control section 17 obtains display information at S124, determines a texture of the display information, corresponding to one example of wall surface display information displayed on the wall surface at S125, and determines a height of the route wall in accordance with an amount of the display information at S126. Instead of the basic wall surface design determined at S121, the texture of the display information determined at S125 is displayed on the wall surface of the route wall, for example, by applying a texture mapping technique to the polygons. The height at S126 is used instead of the basic height used at S122.

As explained in FIG. 3, the basic wall surface design at S121 uses transparent plain white.

Figure 5:
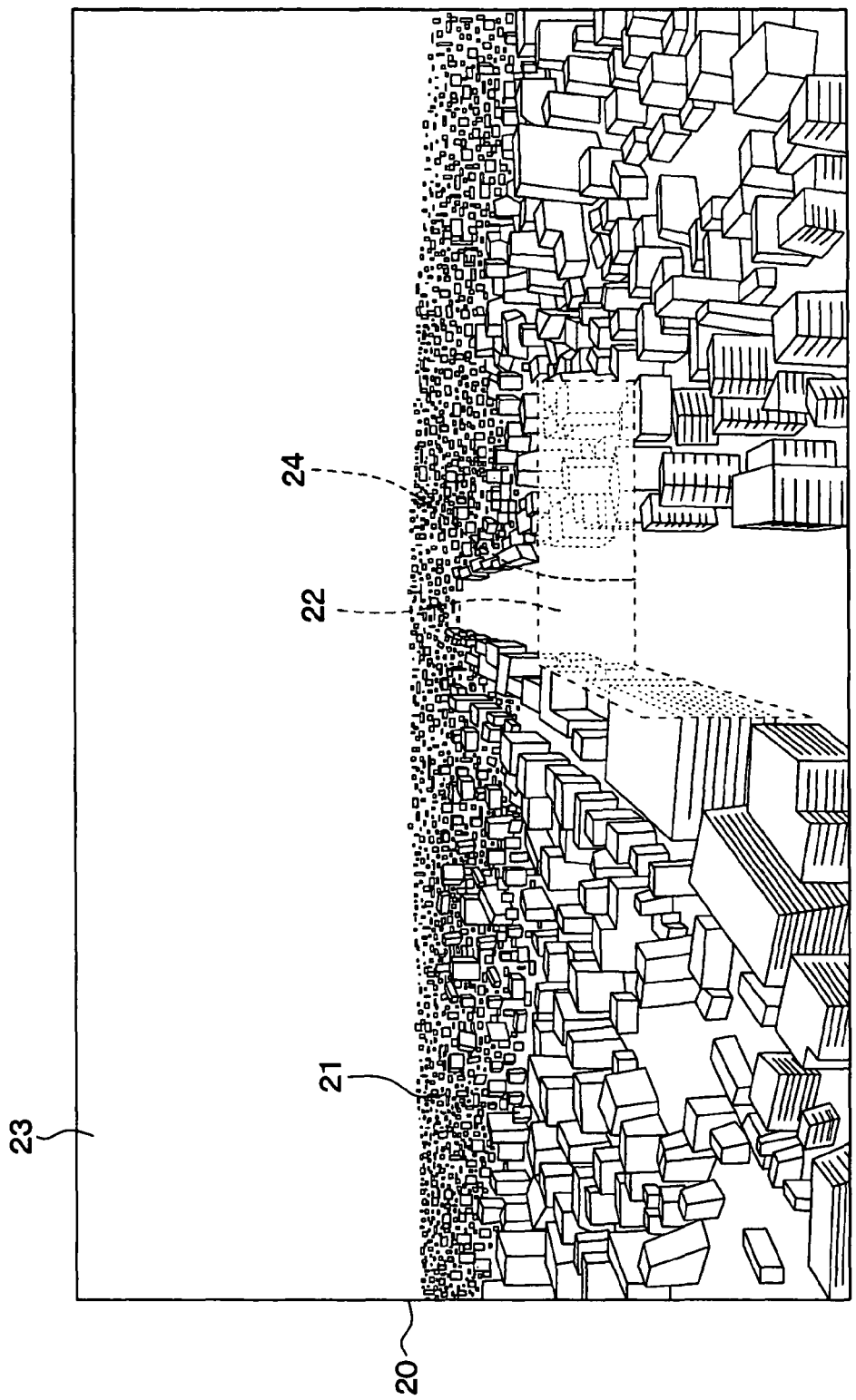
FIG. 5 shows a three-dimensional map image and route wall when a depression angle is larger than that in FIG. 3 according to the first embodiment.

The basic height at S122 is determined based on a predetermined depression angle. This depression angle influences a size of the whole route wall displayed on the display screen. Specifically, the height of the whole route wall becomes smaller uniformly as a depression angle becomes larger. For example, as shown in FIG. 5, when a depression angle is larger than that of the example shown in FIG. 3, a height of the route wall 22 is lower than that shown in FIG. 3 uniformly. For example, a height of the route wall 22 in FIG. 3 may be fifty meters, and a height of the route wall 22 in FIG. 5 may be thirty meters. The height herein is not an actual size relative to the display screen 20, but is a height in a virtual three dimensional space including three-dimensional structures from which the projection image in the display screen 20 is generated.

Accordingly, since a height of the route wall increases when a three-dimensional map image is displayed at a small depression angle, the possibility that the route wall is hidden behind structures such as a building is reduced. Additionally, since the route wall can be easily seen when a three-dimensional map image is displayed at a large depression angle, the visibility of the route wall can be secured even when the height of the route wall is reduced. The height of the route wall is reduced, so that the area where the route wall overlaps with other portions on the display screen can be reduced.

The determination about whether to display the information at S123 may be done based on a setting previously inputted by the user. In other words, the user may determine whether the information display is done using the operating section 13, and the control section 17 may record the determination on a storage medium, and determine whether the information display is done based on the record.

The display information acquired at S124 includes the above additional tune data, data of estimated times of passages through routing points, traffic data, weather data, surrounding facility data, etc.

In some cases, when the additional tune data is acquired, the control section 17 executes the tune playing together with the three-dimensional map image display process. In this case, the control section 17 may acquire, as the display information, the additional tune data corresponding to currently played tune data and the additional tune data of all the tune data to be played in the album containing the currently played tune data upon or after the play of the currently played tune data.

The estimated routing point passage time information shows estimated times of passages through one or more routing points on a guidance route. For example, the control section 17 may acquire the estimated passage times by dividing distances to the routing points on the guidance route by a predetermined travel speed (for example, 30 km/h).

The traffic data includes current traffic situation data in various regions and forecast traffic situation data in various regions acquired from the external information receiving section 15. The weather data includes current weather data in various regions and weather forecast data in various regions acquired from the external information receiving section 15. The surrounding facility data shows information about facilities (for example, stores) around a guidance route, and this information is acquired from the information showing details of facilities in the map data.

The processing for determining a texture of the acquired display information at S125 is explained. The texture of display information means an image showing the display design when displaying the display information on the wall surface of the route wall. For example, a texture of the additional tune data corresponding to currently played tune data may use a jacket image of the album contained in the additional tune data. Additionally, for example, a texture corresponding to the information about rainy weather may use an image showing raindrops.

At S125, a layout of the determined texture on the route wall is also determined, namely, it is determined where to position the determined texture on the route wall. Specifically, a positional range on the guidance route related to display information about each of multiple textures is specified on a guide route, and the texture is positioned to the route wall within the specified positional range.

The following shows an example of a method for specifying a positional range on a guidance route to which certain display information relates. For example, when the display information is additional tune data corresponding to the remaining tune data contained in a currently played album, a time range, corresponding to estimated inside and outside information, from a current time to a time of completion of the play of the album is calculated from the additional tune data, and compared to the estimated passage schedule information. Then, a portion where the album is currently played is estimated on the guidance route, and may be a positional range related to the display information.

For example, when the display information is weather information data showing that a rainfall continues in an area including a portion of the guidance route, a range corresponding to the portion may be a positional range related to the display information.

For example, when the display information is surrounding facility data showing detailed information (for example, opening time, closing time, event information, etc.) of a store close to a certain position on the guidance route, a predetermined range including the certain position may be a positional range related to the display information.

When multiple pieces of display information is related to the same positional range on the guidance route, a texture corresponding to the most urgent piece of display information is assigned to the route wall on the position range. Urgency of an earthquake, accident, typhoon, traffic control, rainy weather, and tune playing may be prioritized in that order.

Information about an estimated time zone of passage through each section of the route wall, the time zone being specified based on the estimated passage schedule information, may be displayed on the section.

Figure 6:
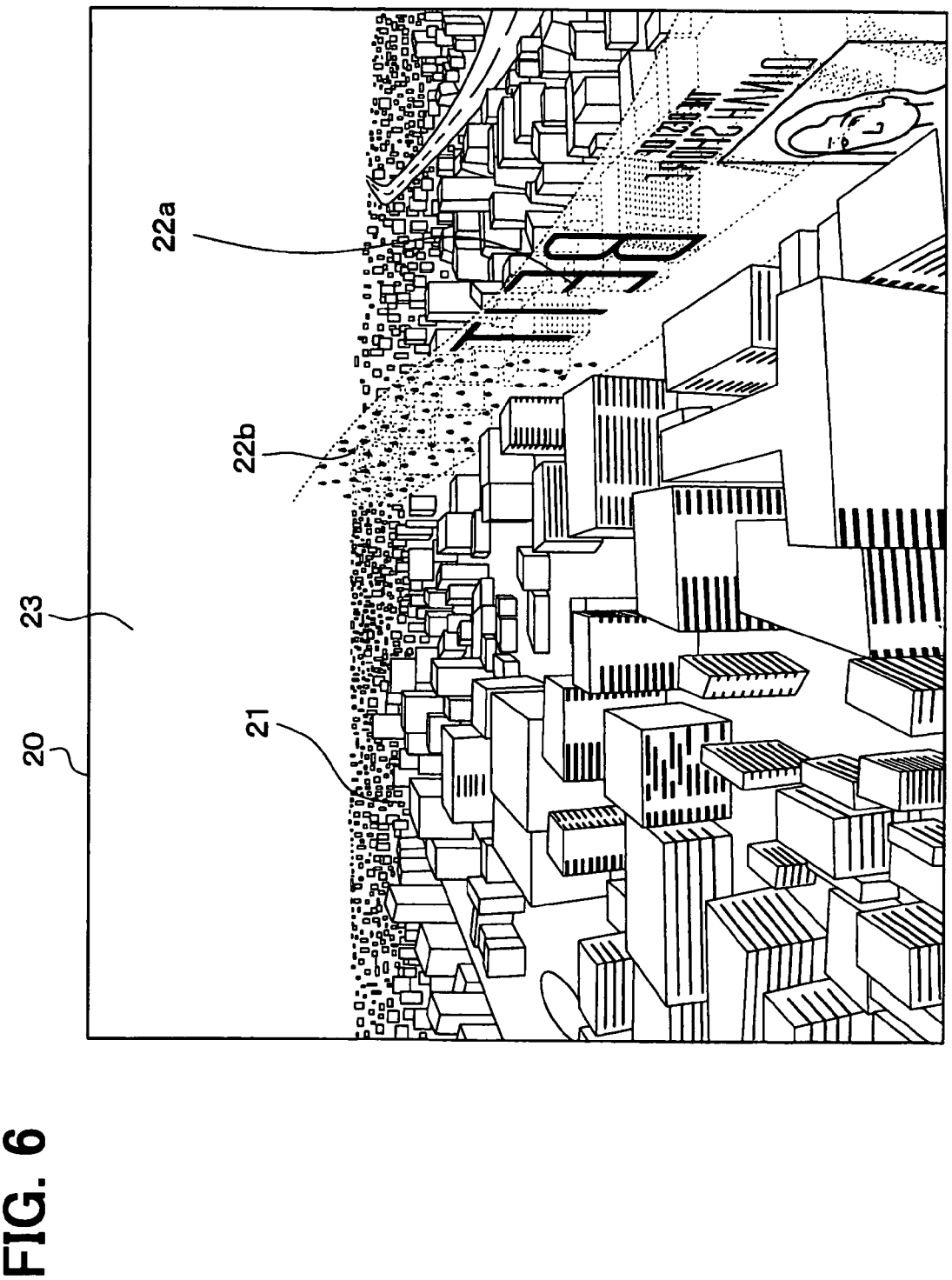
FIG. 6 shows a display example in which multiple textures are arranged on the route wall in the display screen according to the first embodiment.

FIG. 6 shows the example in which multiple textures 22a and 22b are arranged to the route wall 22 in the display screen 20. In this example, the jacket texture 22a is arranged in the positional range where a tune of an album is played, and the rainy weather texture 22b is arranged in the positional range where a rainfall is expected. Structures such as a building behind the route wall can be seen translucently through these textures.

Thus, the space of the wall surface can be used effectively by displaying various information such as tune information, an estimated routing point passage time, a traffic situation, a weather condition, and surrounding facility information in the wall surface of the route wall.

The control section 17 disposes, on a wall surface of the route wall on each of multiple positional ranges on the guidance route, the display information showing a state inside a vehicle or an environment outside the vehicle in a passage time range in the positional range. Accordingly, the guidance route is used as not only a group of positional information but also positional information arranged time-sequentially, so that at a time on or after a current time, the connection between an environment around the user and its positional information becomes visible.

Even when the texture of the route wall changes along the guidance route, a color of the lower end or a portion touching the guidance route of each texture may always be constant in all the ranges of the route wall in the display screen 20. Accordingly, the user can grasp continuity of the guidance route more clearly.

The determination of a height of the route wall at S126 is made based on an amount of the display information. For example, the amount of the display information may be determined by operation of the operating section 13 by the user. In this case, the user selects from a detailed information display and a simple information display by use of the operating section 13. When the control section 17 executes the simple information display in accordance with the operation result, the control section 17 sets a height of the route wall to the same height as the basic height determined at S122. When the control section 17 executes the detailed information display in accordance with the operation result, the control section 17 sets a height of the route wall greater than the basic height determined at S122.

Figure 7:
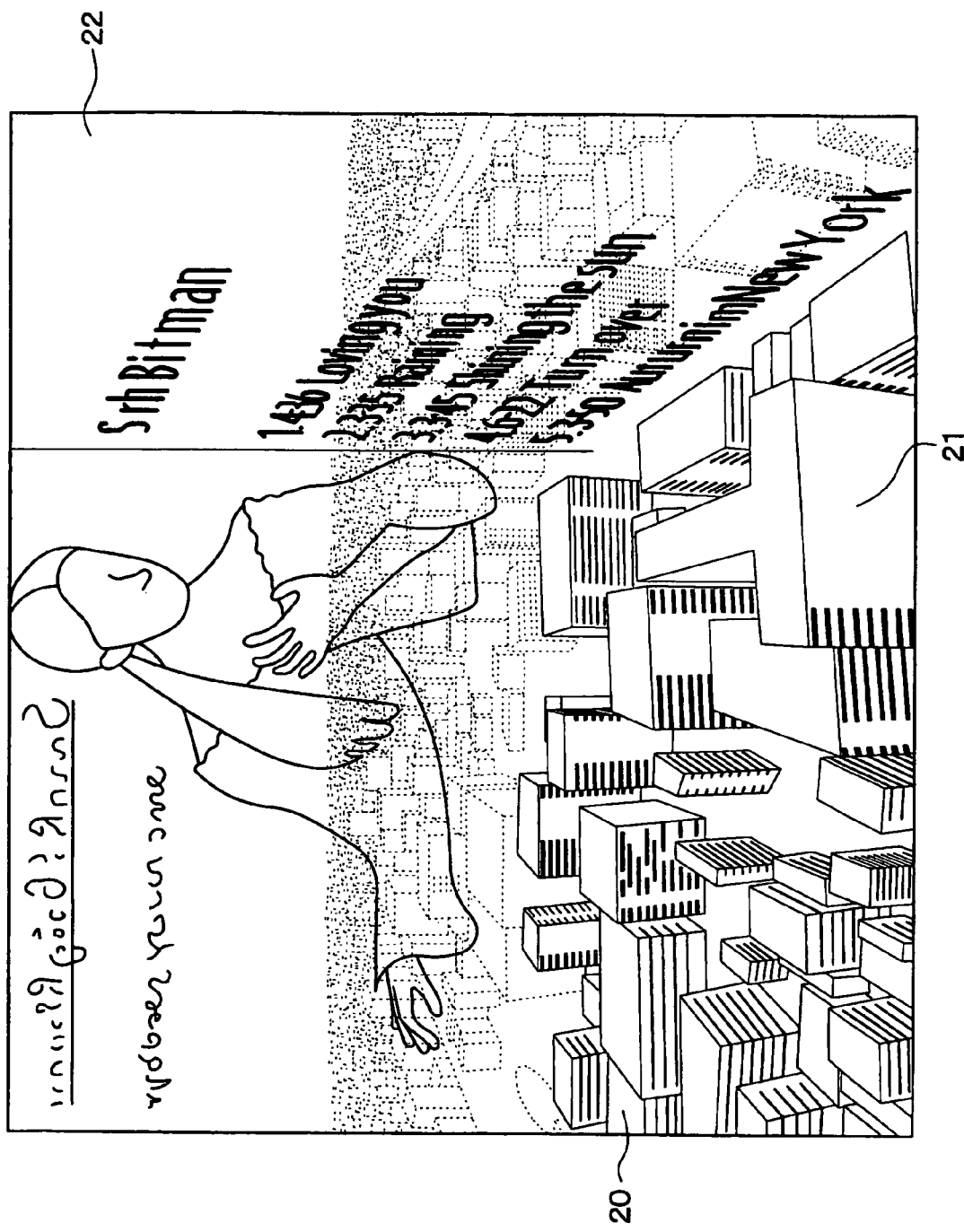
FIG. 7 shows a display example of the route wall when a detailed display is selected and a height of the route wall increases according to the first embodiment.

FIG. 7 shows a display example of the route wall 22 when the detailed information display is selected. When the detailed information display is selected, a height of the route wall 22 becomes high, and content of a texture specified at S125 includes more information. In the example of FIG. 7, a tune list of an album is included in a texture as more detailed tune information.

At S126, a height of the route wall in each positional range on the guidance route becomes higher as an amount of acquisition of the display information related to the positional range becomes greater. For example, the route wall in a positional range related to detail information about a shop in the surrounding facility information obtained at S124 may be higher when the detailed information includes an opening time, a closing time, and event information than when the detailed information includes only the opening time and closing time.

Thus, a height of the route wall 22 is determined in each section of the route wall 22 so that the height becomes higher as an amount of display information becomes larger. As a result, the visibility of the information displayed on the wall surface improves.

In the example of FIG. 7, as a result of increasing the height of the route wall 22, the route wall 22 continues beyond the upper end of the display screen 20. In such a state, the control section 17 may scroll a display area vertically on the route wall 22 within the display screen 20 in accordance with scrolling operation of the operating section 13 by the user.

Thus, when the upper end of the route wall 22 goes beyond the display screen 20, information displayed in the texture of the portion going beyond the display screen 20 can be seen easier because information displayed on the texture is scrolled vertically in the wall surface of the route wall.

Second Embodiment

A second embodiment of the present invention is explained below. A method for determining the basic height of S122 in this embodiment is different from that in the first embodiment. Specifically, the control section 17 determines a height of each section of the route wall so that the height becomes lower as the section is closer to the near side in the three-dimensional space.

For example, the basic height may be changed at each crossing on the guidance route (first method), and the basic height may be gradually changed in a range including the crossing (second method).

Figure 8:
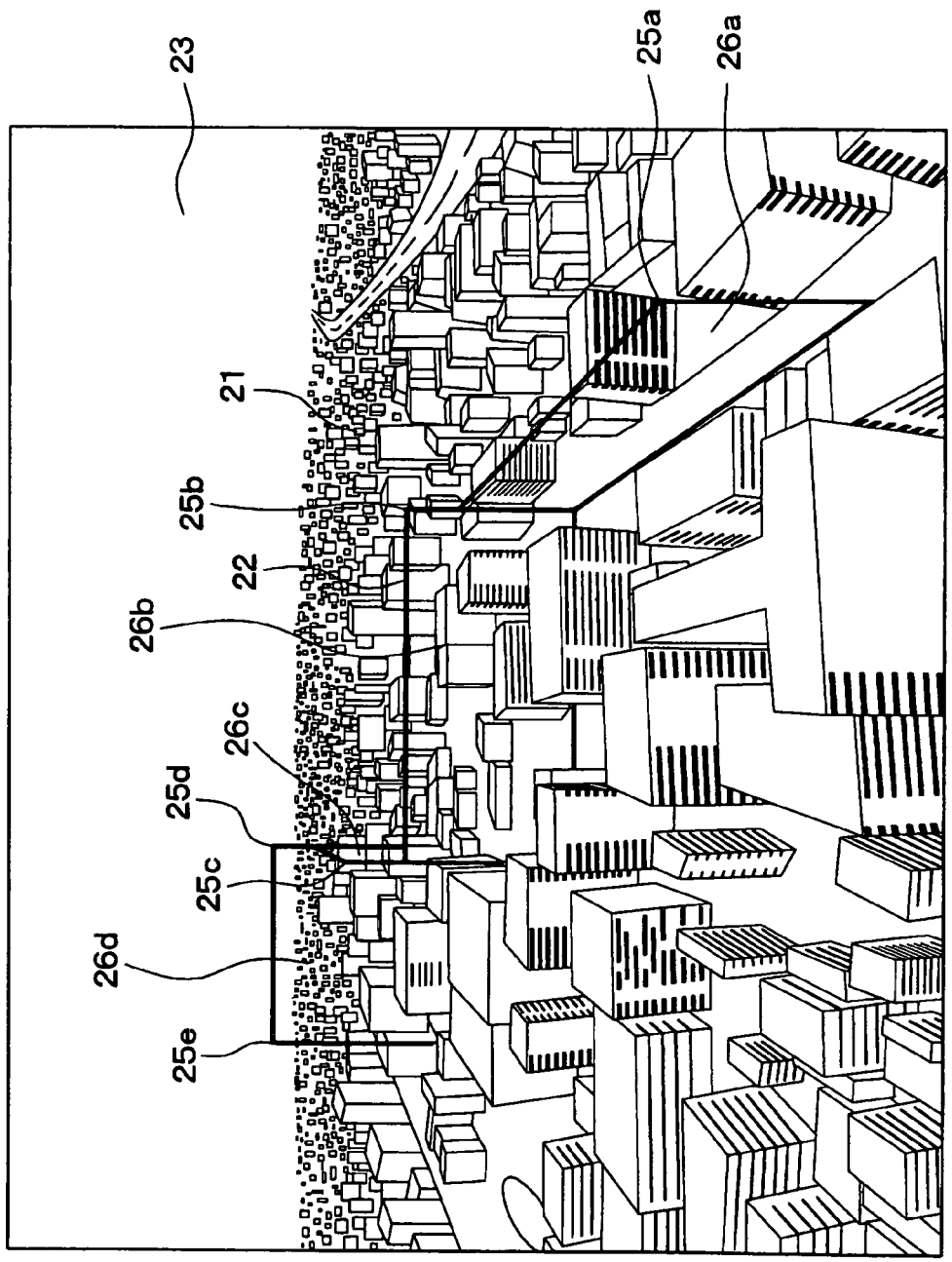
FIG. 8 shows a display example of the route wall in the display screen according to a second embodiment of the present invention.
Figure 9:
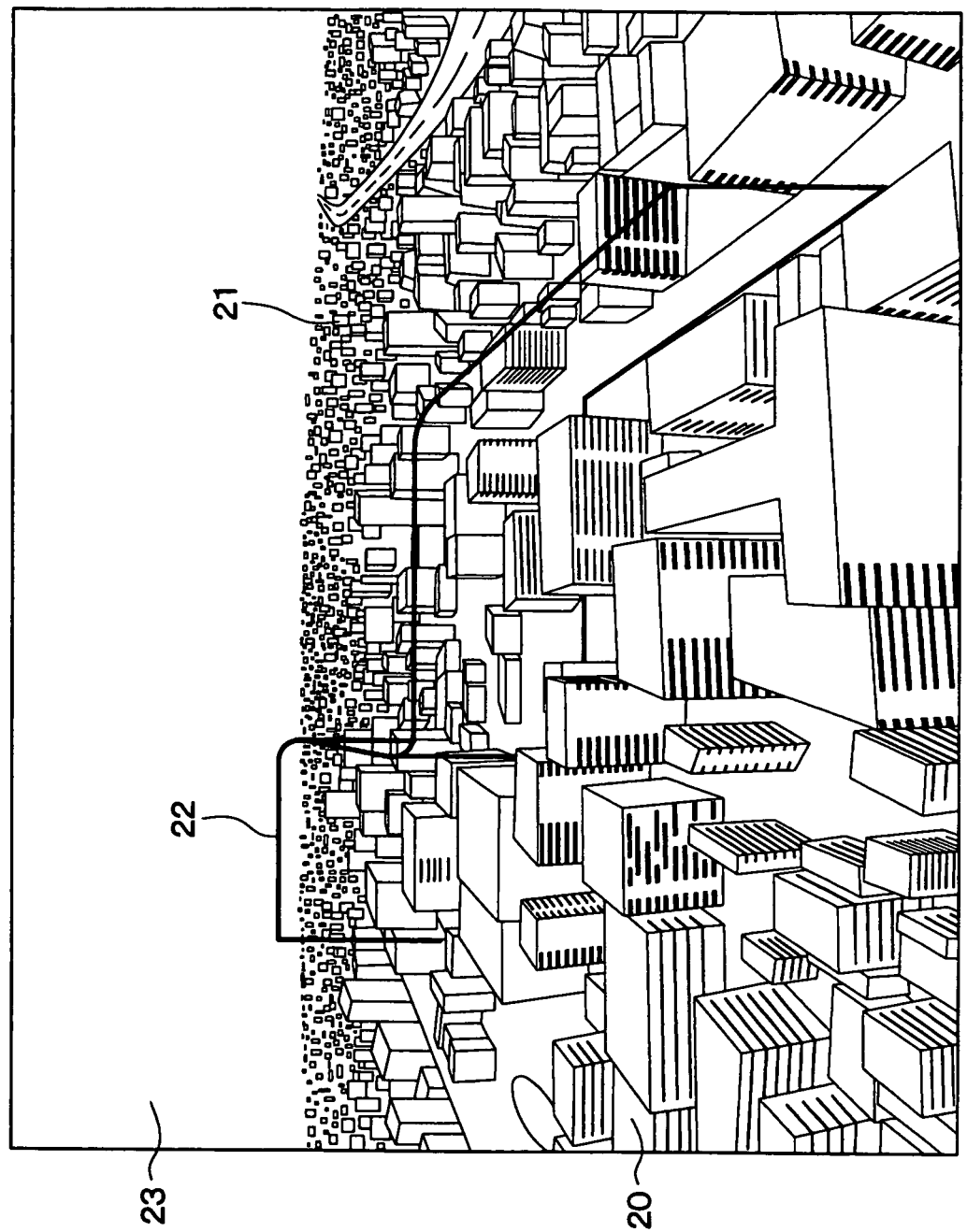
FIG. 9 shows a display example of the route wall in the display screen according to the second embodiment.

FIG. 8 shows a display example of the route wall 22 in the display screen 20 in the first method, and FIG. 9 shows a display example of the route wall 22 in the display screen 20 in the second method. In FIGS. 8 and 9, only an outer shape and bent portions of the route wall 22 are shown using solid lines. The actual design in the wall surface of the route wall 22 is the same as in the first embodiment.

In the examples of FIGS. 8 and 9, the guidance route contains three crossings. At upper ends 25b to 25d of the route wall on these three crossings, the height of the route wall 22 is changed step-by-step. In a range 26a from an edge 25a closest to the user in the three-dimensional space to a crossing 25b, a height of the route wall 22 is a constant value h1. In a range 26b from the crossing 25b to a crossing 25c, a height of the route wall 22 is a constant value h2 (h2>h1). In a range 26c from the crossing 25c to a crossing 25d, a height of the route wall 22 is a constant value h3 (h3>h2). In a range 26d from the crossing 25d to a crossing 25e farthest from the user in three-dimensional space, a height of the route wall 22 is a constant value h4 (h4>h3).

Thus, the height of the route wall is changed at each crossing suddenly, so that the user can grasp a structure of these turns even when the guidance route turns complicatedly. For example, at the range 26c less visible from the user and its surrounding, the route wall is higher in the range 26c than in the range 26b. Accordingly, a degree to which the route wall in the range 26c is hidden behind the route wall in the range 26b is reduced, so that the structure of the turning around the range 26c can be grasped easily.

As shown in FIG. 9, through the second method, the height of the route wall increases from the near side smoothly towards the back side when viewed from the user in the three-dimensional space. In FIG. 9, the increase rate of the height of the route wall per a unit distance along the guidance route is constant. This rate may be a high value near crossings, and be a low value in other portions. Thus, a smooth change of the height of the route wall can be realized while achieving the effectiveness in the first method.

The height of the route wall 22 in the three-dimensional space becomes lower at the nearer side of the route wall 22 to the user in the three-dimensional space. The possibility that the route wall 22 at the near side overlaps with the route wall 22 at the back side is reduced, so that the possibility that the arrangement of the route wall 22 becomes unclear is reduced.

The determination of the basic height in the first embodiment and the determination of the basic height in this embodiment may be combined with each other.

Third Embodiment

A third embodiment of the present invention is explained below. This embodiment differs from the first embodiment in a basic wall surface design determined by the control section 17 at S121. Specifically, at S121, the control section 17 determines that at least one data of lightness, color tone, saturation, pattern, and transmission of the route wall changes along the height direction of the route wall (in the three dimensional space). In both embodiments, the route wall is transparent.

For example, the transmission of the route wall may be made higher at a higher position of the route wall. In this case, the transparency is high at an upper portion of the route wall, so that the visibility of the structures behind the route wall improves. Additionally, the transparency is low at the lower portion of the route wall, the user can recognize the guidance route more clearly.

The lower end (facing a road) of the route wall may be white, and the color of the route wall may be changed increasingly at a higher portion of the route wall. The lightness may be continuously reduced from the lower end to upper end of the route wall. The consistency of the pattern may be reduced from the lower end to upper end of the route wall.

Figure 10:
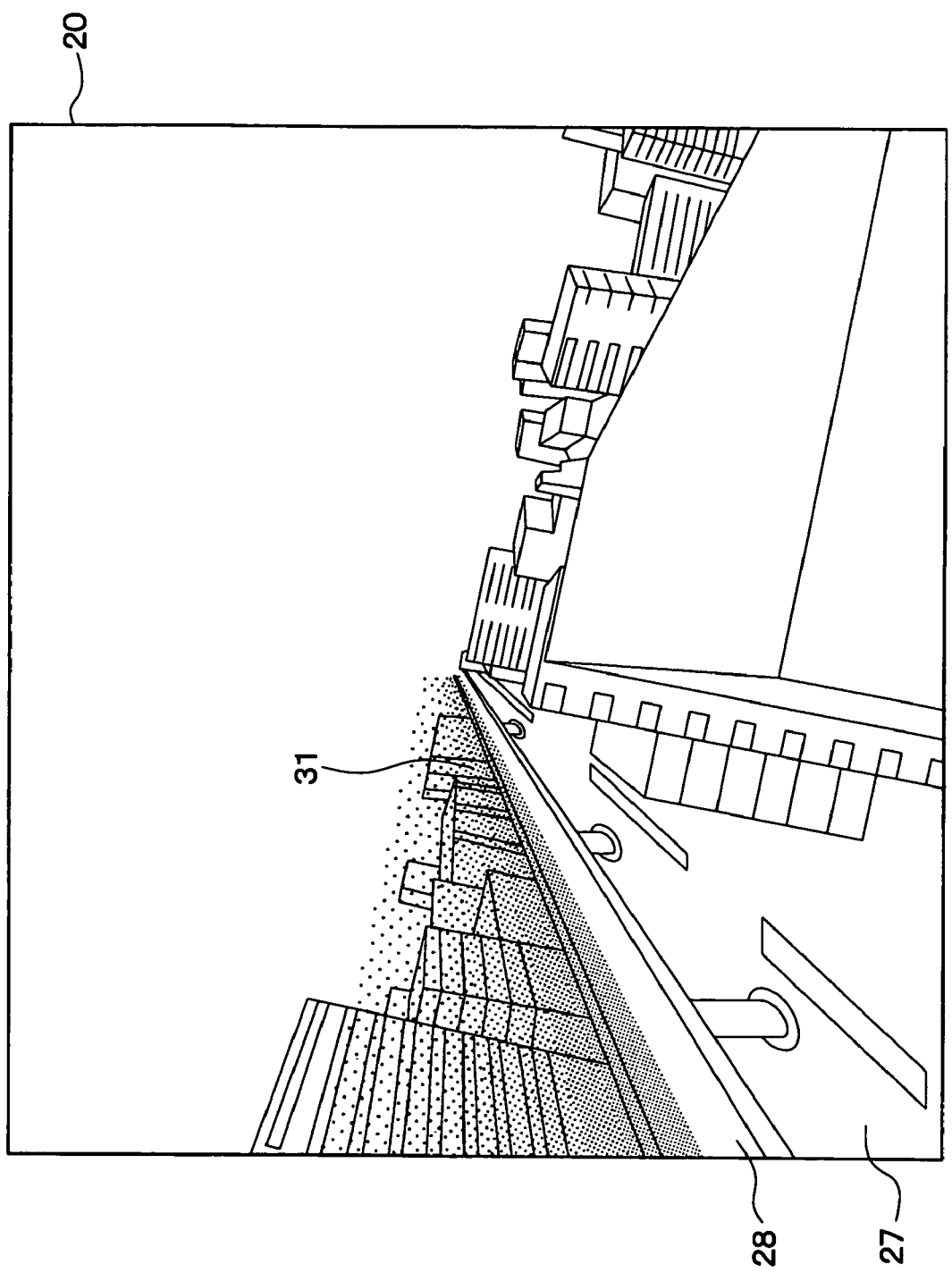
FIG. 10 shows a route wall which stands from a highway and in which consistency of a pattern changes according to a third embodiment of the present invention.
Figure 11:
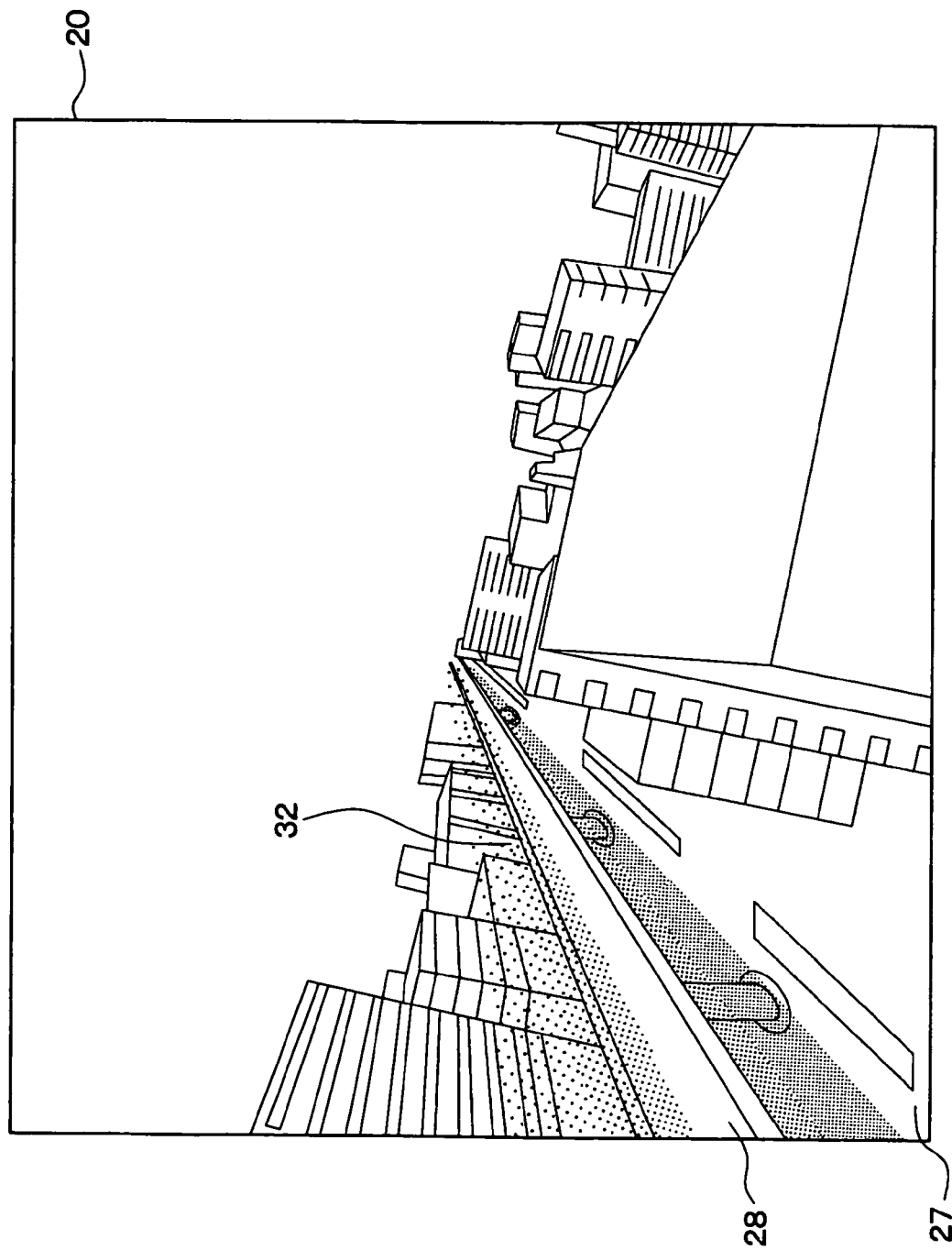
FIG. 11 shows a route wall which stands from the highway and in which consistency of a pattern changes according to the third embodiment.

FIGS. 10 and 11 show a display example of route walls 31 and 32 in the display screen 20, the consistency of the pattern changing in the route walls 31 and 32. In FIG. 10, a highway 28 above an ordinary road 27 is the guidance route, and in FIG. 11, the ordinary road 27 is the guidance route.

The route walls 31 and 32 extend upward from the highway 28 and ordinary road 27, respectively. When the color tones of route walls 31 and 32 are uniform, the ordinary road 27 and highway 28 overlap with each other, and thus there is a possibility that it is difficult for the user to determine from which of the ordinary road 27 and highway 28 the route walls 31 and 32 extend. However, when at least one data of lightness, color tone, saturation, pattern, and transmission of the route walls changes from at the lower portions to upper portions of the route walls 31 and 32, the user can grasp at which height the guidance route exists in accordance with a change of the design of the route wall.

In the above embodiments, the vehicular navigation apparatus 1 corresponds to one example of the map display controller. The control section 17 functions as one example of a route specifying means or unit by executing S115 of the program 100, functions as one example of a towering structure configuring means or unit by executing S120, and functions as one example of a display instruction means or unit by executing S130.

The broken lines of the upper and lower ends of the route wall in FIGS. 3, 5, and 6 explained in the above embodiments are shown for convenience so that the route wall is distinguished easily. Such boundary lines may be or may be not displayed on the upper and lower ends of the route wall displayed in the actual display screen of the display device 12.

Alternative Embodiment

The embodiments of the present invention has been described above. The range of the present invention is not limited only to the above embodiments, and includes various modes which can realize the functions of the present invention.

For example, although the display color of the route wall 22 when the route wall 22 is shown in solid color is white in the above embodiments, the display color may be bright yellow, bright green, etc. When the lightness of the display color of the route wall 22 is determined to be higher than the average lightness of the three-dimensional map image 21 currently displayed on the display screen 20, the user distinguishes between the three-dimensional map image 21 and the route wall 22 clearly like when the route wall 22 is displayed in white, and the route wall 22 looks like a lighting wall to reduce a tight feeling.

In the above embodiments, although the route wall is displayed together with a three-dimensional map image at the time of a route guidance, the route wall may be displayed together with a three-dimensional map image at the time of other operations. In that case, the route shown by the route wall does not need to be a guidance route, but may be a route determined by other methods.

In the above embodiments, even when a texture changes in the route wall along a guidance route so that the user can grasp continuity of the guidance route more clearly, the lower end of the texture may be constant in all ranges of the route wall in the display screen 20. However, such a structure is not always necessary for the user to grasp continuity of the guidance route. For example, even when color does not change from the upper end to lower end of the route wall and changes along the route, it is possible to grasp the continuity of the guidance route. As long as the lower end of the route wall is colored to be able to recognize the continuity of the route, the user can grasp the continuity of the guidance route.

The control section 17 may scroll a display area along the route (in the left and right directions in the wall surface) on the route wall in the display screen 20 in response to left and right scrolling of the operating section 13 by the user. Accordingly, the degree of freedom of the information display in the wall surface increases.

The towering structure of the present invention does not always need to be a route having a wall shape. For example, the towering structure may be multiple cylindrical bodies discretely arranged along the route.

The map display controller of the present invention may not be applied to a vehicular navigation apparatus, but may be applied to a portable map display device (for example, a portable telephone having a map display function), and to a non-portable personal computer to which a program for map displaying can be installed.

In the above embodiments, the functions realized because the control section 17 executes the program may be realized using hardware (for example, FPGA in which circuitry can be programmed) having the functions.

In other words, each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Aspects)

Aspects of the subject matter described herein are set out in the following clauses.

According to a first aspect, a map display controller for displaying a three-dimensional map image on a display device is provided as follows. A route specifying function is included for specifying a route in the three-dimensional map image. A towering structure configuring function is included for generating configuration data to configure a towering structure standing from a route along the route in a three-dimensional space shown by the three-dimensional map image. A display instruction function is included for displaying an image of the towering structure incorporated in the three-dimensional map image on the display device such that a portion behind the towering structure in the three-dimensional space of the three-dimensional map image can be translucently or transparently seen through the towering structure.

Accordingly, since the towering structure standing from the specified route in the three-dimensional space is above the route, the towering structure is more conspicuous than the route. Further, since the towering structure stands from the route along the route, a position of the towering structure shows a position of the route directly. Therefore, when the three-dimensional map image is displayed on the display device, the route can be confirmed easily.

Accordingly, since the portion behind the towering structure can be transparently seen through the towering structure, the decrease of visibility of the structures behind the towering structure can be reduced.

According to a second aspect, a map display controller for displaying a three-dimensional map image is provided as follows. A route specifying function is included for specifying a route in the three-dimensional map image. A towering structure configuring function is included for generating configuration data for configuring a towering structure standing in the shape of a wall along the route specified by the route specifying function in a three-dimensional space shown by the three-dimensional map image. A display instruction function is included for displaying, on a display device, an image of the towering structure incorporated in the three-dimensional map image in accordance with the configuration data. Herein, the towering structure configuring function specifies wall surface display information displayed on the wall surface of the towering structure as part of the configuration data.

Accordingly, also in the second aspect, through the common portion to the first aspect, a route can be confirmed easily when the three-dimensional map image is displayed on the display device. In the second aspect, the towering structure configuring function specifies the wall surface display information displayed on the wall surface of the towering structure as part of the configuration data. Accordingly, the map display controller can display the specified information on the wall surface of the towering structure having a wall shape. A space of the wall surface can be effectively used by displaying information on the wall surface.

As part of the configuration data, data of a height of the towering structure may be determined so that the height becomes higher as an amount of the wall surface information becomes larger. Accordingly, the visibility of the information displayed on the wall surface improves.

The route specifying function may obtain estimated passage schedule information showing a passage time in each of multiple positions on the specified route on or after a current time. The towering structure configuring function may obtain estimated inside and outside information showing a state in a vehicle or an environment outside the vehicle in each of multiple times on or after a current time. The estimated inside and outside information may be different from or the same as the estimated passage schedule information.

In this case, the towering structure configuring function may specify the wall surface information for displaying, on a portion of the wall surface above each of multiple positional ranges on the route, a state in a vehicle or an environment outside the vehicle in a passage time range corresponding the positional range, in accordance with the estimated inside and outside information and estimated passage schedule information.

Accordingly, the route is treated not only as a group of positional information but also positional information arranged time-sequentially, so that, at a certain time on or after a current time, the connection between an environment around the user and the positional information can be visualized.

The map display controller may allow the wall surface display information to be scrolled vertically within the wall surface on the display device in accordance with user's operation, when an upper end of the towering structure goes beyond a display range of the display device. Accordingly, the wall surface display information can be seen easily.

The map display controller may allow the wall surface display information to be scrolled along the route within the wall surface in accordance with user's operation. Accordingly, the degree of freedom of the information display in the wall surface increases.

The map display controller may determine, as part of the configuration data, data of a height of the towering structure in the three-dimensional space so that the height becomes lower as a depression angle relative to the three-dimensional map image becomes larger.

A height of the towering structure increases when the three-dimensional map image is displayed at a small depression angle. This reduces the possibility that the towering structure is hidden behind the other structures such as a building. In contrast, the towering structure can be easily seen when the three-dimensional map image is displayed at a large depression angle. The visibility of the towering structure can be secured even when the height of the towering structure decreases. Decrease of the height of the towering structure can reduce the area where the towering structure overlaps with the other portions on the display screen due to the decrease of the height of the towering structure.

The towering structure configuring function may determine, as part of the configuration data, data of the height of the towering structure in the three-dimensional space so that the height becomes lower as a viewpoint of the user moves to the nearer side in the three-dimensional space. This accordingly reduces the possibility that arrangement of the towering structure becomes unclear when the towering structure at the near side overlaps with the towering structure at the back side.

The map display controller may determine data of a display color of a towering structure so that the color becomes white, as part of the configuration data. Recognition of the route becomes easier because the towering structure is shown in white, which allows the towering structure to be distinguished from the three-dimensional map image clearly. The possibility that the user has a tight feeling due to the towering structure is reduced by using light color such as white such that the towering structure looks like a light band.

The map display controller may determine data of lightness of a display color of the towering structure so that the lightness becomes higher than average lightness of the three-dimensional map image displayed on the display device, as part of the configuration data. Also in this case, the same advantage as that when the towering structure is displayed in white is obtained.

The map display controller may determine that one data of lightness, color tone, saturation, pattern, and transmission of the towering structure changes along the height direction of the towering structure, as part of the configuration data. Accordingly, the user can grasp where the route exists, as one changed standard of lightness, color tone, saturation, pattern, and transmission of the towering structure.

The map display controller may determine data of transmission of the towering structure so that the transmission becomes higher at an upper position of the towering structure, as part of the configuration data. Accordingly, since the transparency is high in the upper portion of the towering structure, the visibility of the structures such as a building through the towering structure improves. Additionally, since the transparency in the lower portion of the towering structure is low, the route can be recognized more clearly.

The map display controller determines data of color of the towering structure so that a portion touching the route in the towering structure is colored to be able to recognize the continuity of the route in the display screen of the display device, as part of the configuration data.

For example, the map display controller may determine data of a color of the towering structure so that a color of the portion touching the route in the towering structure is uniform in the display screen of the display device, as part of the configuration data. Accordingly, the user can grasp the continuity of the route more clearly.

Further, as a third aspect, the first aspect may be provided as a method for displaying a three-dimensional map image on a display device. That is, the method includes the following: (i) specifying a route in the three-dimensional map image; (ii) generating configuration data to configure a towering structure which stands along the route specified in a three-dimensional space shown by the three-dimensional map image; and (iii) displaying, on the display device, an image incorporated in the towering structure in the three-dimensional map image in accordance with the configuration data generated so that a portion behind the towering structure in the three-dimensional space in the three-dimensional map image is able to be seen through the towering structure.

Further, as yet another aspect, the method according to the third aspect may be provided as instructions included in a computer readable medium, the instructions being executed by a computer for displaying a three-dimensional map image on a display device.

Further, as a fourth aspect, similarly, the second aspect may be provided as a method for displaying a three-dimensional map image on a display device. That is, the method includes the following: (i) specifying a route in the three-dimensional map image; (ii) generating configuration data to configure a towering structure which stands along the route specified by the route specifying unit in a three-dimensional space shown by the three-dimensional map image, the configuration data including information displayed on a wall surface of the towering structure; and (iii) displaying, on the display device, an image of the towering structure incorporated in the three-dimensional map image in accordance with the configuration data generated.

Further, as yet another aspect, the method according to the fourth aspect may be provided as instructions included in a computer readable medium, the instructions being executed by a computer for displaying a three-dimensional map image on a display device.

It will be obvious to those skilled in the art that various changes may be made in the above-described embodiments of the present invention. However, the scope of the present invention should be determined by the following claims.

What is claimed is:

1. A map display controller for displaying a three-dimensional map image on a display device, the map display controller comprising:
    means for specifying a route in the three-dimensional map image, and acquiring estimated passage schedule information indicating a passage time on or after a current time in each of a plurality of positions on the route;
    means for generating configuration data for configuring a towering structure standing in a shape of a wall along the route specified by the specifying means, in a three-dimensional space shown by the three-dimensional map image;
    means for displaying, on the display device, an image in which the towering structure is incorporated into the three-dimensional map image in accordance with the configuration data generated by the generating means; and
    means for acquiring data corresponding to a time range, wherein:
    the generating means specifies, as part of the configuration data, wall surface display information that is displayed on a wall surface of the towering structure, the wall surface display information corresponding to the data acquired by the acquiring means; and
    a positional range on the route, the positional range where the wall surface display information is arranged, is specified based on the time range corresponded to by the data acquired by the acquiring means and the estimated passage schedule information.

2. A map display controller for displaying a three-dimensional map image on a display device, the map display controller comprising:
    means for specifying a route in the three-dimensional map image;
    means for generating configuration data for configuring a towering structure standing in a shape of a wall along the route specified by the specifying means, in a three-dimensional space shown by the three-dimensional map image;
    means for displaying, on the display device, an image in which the towering structure is incorporated into the three-dimensional map image in accordance with the configuration data generated by the generating means; and
    means for acquiring data including positional information; wherein:
    the generating means specifies, as part of the configuration data, wall surface display information that is displayed on a wall surface of the towering structure, the wall surface display information corresponding to the data acquired by the acquiring means; and
    a positional range on the route, the positional range where the wall surface display information is arranged, is specified based on the positional information included in the data acquired by the acquiring means.

3. The map display controller according to claim 1, wherein
    the generating means determining, as part of the configuration data, data of a height of the towering structure in the three-dimensional space such that the height becomes higher as an amount of the wall surface information becomes larger.

4. The map display controller according to claim 1, wherein
    the displaying means scrolls the wall surface display information within the wall surface vertically in accordance with operation by a user when an upper end of the towering structure goes beyond a display range of the display device.

5. The map display controller according to claim 1, wherein
    the displaying means scrolls the wall surface display information within the wall surface along the route in accordance with operation by a user.

6. The map display controller according to claim 1, wherein
    the generating means determines, as part of the configuration data, data of a height of the towering structure in the three-dimensional space such that the height becomes lower as a depression angle relative to the three-dimensional map image becomes larger.

7. The map display controller according to claim 1, wherein
    the generating means determines, as part of the configuration data, data of a height of the towering structure in the three-dimensional space such that the height becomes lower as a viewpoint of a user is nearer to a front side in the three-dimensional space.

8. The map display controller according to claim 1, wherein
    the generating means determines, as part of the configuration data, data of a display color of the towering structure such that the display color becomes white.

9. The map display controller according to claim 1, wherein
the generating means determines, as part of the configuration data, data of a lightness of a display color of the towering structure such that the lightness becomes higher than average lightness of the three-dimensional map image displayed on the display device.

10. The map display controller according to claim 1, wherein
the generating means determines, as part of the configuration data, with respect to the towering structure, one data of lightness, color tone, saturation, pattern, and transmission, such that the one data changes along a height direction in the towering structure.

11. The map display controller according to claim 1, wherein
the generating means determines, as part of the configuration data, data of a transmission of the towering structure such that the transmission becomes higher at an upper position in the towering structure.

12. The map display controller according to claim 1, wherein
the generating means determines, as part of the configuration data, data of a color of the towering structure such that a color of a portion touching the route in the towering structure becomes a color enabling continuity of the route to be recognized in a display screen of the display device.

13. The map display controller according to claim 12, wherein
the generating means determines, as part of the configuration data, data of the color of the towering structure such that the color of the portion touching the route in the towering structure becomes constant in the display screen of the display device.

14. The map display controller according to claim 12, wherein
the generating means determining, as part of the configuration data, data of a height of the towering structure in the three-dimensional space such that the height becomes higher as an amount of the wall surface information becomes larger.

15. The map display controller according to claim 2, wherein
the displaying means scrolls the wall surface display information within the wall surface vertically in accordance with operation by a user when an upper end of the towering structure goes beyond a display range of the display device.

16. The map display controller according to claim 2, wherein
the displaying means scrolls the wall surface display information within the wall surface along the route in accordance with operation by a user.

17. The map display controller according to claim 2, wherein
the generating means determines, as part of the configuration data, data of a height of the towering structure in the three-dimensional space such that the height becomes lower as a depression angle relative to the three-dimensional map image becomes larger.

18. The map display controller according to claim 2, wherein
the generating means determines, as part of the configuration data, data of a height of the towering structure in the three-dimensional space such that the height becomes lower as a viewpoint of a user is nearer to a front side in the three-dimensional space.

19. The map display controller according to claim 2, wherein
the generating means determines, as part of the configuration data, data of a display color of the towering structure such that the display color becomes white.

20. The map display controller according to claim 2, wherein
the generating means determines, as part of the configuration data, data of a lightness of a display color of the towering structure such that the lightness becomes higher than average lightness of the three-dimensional map image displayed on the display device.

21. The map display controller according to claim 2, wherein
the generating means determines, as part of the configuration data, with respect to the towering structure, one data of lightness, color tone, saturation, pattern, and transmission, such that the one data changes along a height direction in the towering structure.

22. The map display controller according to claim 2, wherein
the generating means determines, as part of the configuration data, data of a transmission of the towering structure such that the transmission becomes higher at an upper position in the towering structure.

23. The map display controller according to claim 2, wherein
the generating means determines, as part of the configuration data, data of a color of the towering structure such that a color of a portion touching the route in the towering structure becomes a color enabling continuity of the route to be recognized in a display screen of the display device.

24. The map display controller according to claim 23, wherein
the generating means determines, as part of the configuration data, data of the color of the towering structure such that the color of the portion touching the route in the towering structure becomes constant in the display screen of the display device.

25. A program product stored in a non-transitory computer readable storage medium comprising instructions for execution by a computer, the instructions including a computer-implemented method for a map display controller displaying a three-dimensional map image on a display device,
the instructions for implementing:
specifying a route in the three-dimensional map image, and acquiring estimated passage schedule information indicating a passage time on or after a current time in each of a plurality of positions on the route;
generating configuration data for configuring a towering structure standing in a shape of a wall along the route, in a three-dimensional space shown by the three-dimensional map image;
displaying, on the display device, an image in which the towering structure is incorporated into the three-dimensional map image in accordance with the configuration data; and
acquiring data corresponding to a time range,
wherein:
in the generating of the configuration data, as part of the configuration data, wall surface display information is specified which is displayed on a wall surface of the towering structure, the wall surface display information corresponding to the data corresponding to the time range; and a positional range on the route, the positional range where the wall surface display information is arranged, is specified based on the time range corresponded to by the data and the estimated passage schedule information.

26. A program product stored in a non-transitory computer readable storage medium comprising instructions for execution by a computer, the instructions including a computer-implemented method for a map display controller displaying a three-dimensional map image on a display device, the instructions for implementing:

specifying a route in the three-dimensional map image;

generating configuration data for configuring a towering structure standing in a shape of a wall along the route, in a three-dimensional space shown by the three-dimensional map image;

displaying, on the display device, an image in which the towering structure is incorporated into the three-dimensional map image in accordance with the configuration data; and acquiring data including positional information;

wherein:

in the generating of the configuration data, as part of the configuration data, wall surface display information is specified which is displayed on a wall surface of the towering structure, the wall surface display information corresponding to the data including the positional information; and a positional range on the route, the positional range where the wall surface display information is arranged, is specified based on the positional information included in the data acquired.

27. A map display controller for displaying a three-dimensional map image on a display device, the map display controller comprising:

means for specifying a route in the three-dimensional map image;

means for generating configuration data for configuring a towering structure standing in a shape of a wall along the route specified by the specifying means, in a three-dimensional space shown by the three-dimensional map image;

means for displaying, on the display device, an image in which the towering structure is incorporated into the three-dimensional map image in accordance with the configuration data generated by the generating means; and means for acquiring and using data from a storage medium, wherein:

the generating means generates, as the wall surface display information for displaying on the wall surface of the towering structure, an image which indicates information contained in additional data that is stored in the storage medium in association with the data based on a premise that the data is acquired from the storage medium and used by the acquiring means, and includes the image, which is generated, into the configuration data.

28. A map display controller for displaying a three-dimensional map image on a display device, the map display controller comprising:

means for specifying a route in the three-dimensional map image;

means for generating configuration data for configuring a towering structure standing in a shape of a wall along the route specified by the specifying means, in a three-dimensional space shown by the three-dimensional map image;

means for displaying, on the display device, an image in which the towering structure is incorporated into the three-dimensional map image in accordance with the configuration data generated by the generating means; and means for acquiring weather data wirelessly from an outside of the map display controller, wherein the generating means generates, as the wall surface display information for displaying on the wall surface of the towering structure, an image corresponding to weather indicated by the weather data acquired by the acquiring means, and includes the image, which is generated, into the configuration data.

29. A map display controller for displaying a three-dimensional map image on a display device, the map display controller comprising:

means for specifying a route in the three-dimensional map image;

means for generating configuration data for configuring a towering structure standing in a shape of a wall along the route specified by the specifying means, in a three-dimensional space shown by the three-dimensional map image;

means for displaying, on the display device, an image in which the towering structure is incorporated into the three-dimensional map image in accordance with the configuration data generated by the generating means; and means for acquiring traffic status data wirelessly from an outside of the map display controller, wherein the generating means generates, as the wall surface display information for displaying on the wall surface of the towering structure, an image corresponding to a traffic status indicated by the traffic status data acquired by the acquiring means, and includes the image, which is generated, into the configuration data.

30. A program product stored in a non-transitory computer readable storage medium comprising instructions for execution by a computer, the instructions including a computer-implemented method for a map display controller displaying a three-dimensional map image on a display device, the instructions for implementing:

specifying a route in the three-dimensional map image;

generating configuration data for configuring a towering structure standing in a shape of a wall along the route, in a three-dimensional space shown by the three-dimensional map image;

displaying, on the display device, an image in which the towering structure is incorporated into the three-dimensional map image in accordance with the configuration data; and acquiring and using data from a storage medium, wherein:

in the generating of the configuration data, as the wall surface display information for displaying on the wall surface of the towering structure, an image is generated which indicates information contained in additional data that is stored in the storage medium in association with the data based on a premise that the data is acquired from the storage medium and used, and the image, which is generated, is included into the configuration data.

31. A program product stored in a non-transitory computer readable storage medium comprising instructions for execution by a computer, the instructions including a computer-implemented method for a map display controller displaying a three-dimensional map image on a display device, the instructions for implementing:

specifying a route in the three-dimensional map image;

generating configuration data for configuring a towering structure standing in a shape of a wall along the route, in a three-dimensional space shown by the three-dimensional map image;

displaying, on the display device, an image in which the towering structure is incorporated into the three-dimensional map image in accordance with the configuration data; and acquiring weather data wirelessly from an outside of the map display controller, wherein in the generating of the configuration data, as the wall surface display information for displaying on the wall surface of the towering structure, an image is generated which corresponds to weather indicated by the weather data acquired, and the image, which is generated, is included into the configuration data.

32. A program product stored in a non-transitory computer readable storage medium comprising instructions for execution by a computer, the instructions including a computer-implemented method for a map display controller displaying a three-dimensional map image on a display device, the instructions for implementing:

specifying a route in the three-dimensional map image;

generating configuration data for configuring a towering structure standing in a shape of a wall along the route, in a three-dimensional space shown by the three-dimensional map image;

displaying, on the display device, an image in which the towering structure is incorporated into the three-dimensional map image in accordance with the configuration data; and acquiring traffic status data wirelessly from an outside of the map display controller, wherein in the generating of the configuration data, as the wall surface display information for displaying on the wall surface of the towering structure, an image is generated which corresponds to a traffic status indicated by the traffic status data acquired, and the image, which is generated, is included into the configuration data.

* * * * *